(12) United States Patent
Oliver (10) Patent No.: US 8,973,137 B1
(45) Date of Patent: Mar. 3, 2015

(54) SYSTEMS AND METHODS FOR DETECTING ILLEGITIMATE OUT-OF-BAND AUTHENTICATION ATTEMPTS

(75) Inventor: Ian Oliver, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 277 days.

(21) Appl. No.: 13/408,532

(22) Filed: Feb. 29, 2012

(51) Int. Cl.
*H04L 29/06* (2006.01)
*G06F 21/56* (2013.01)
*G06F 21/55* (2013.01)

(52) U.S. Cl.
CPC ............ *G06F 21/566* (2013.01); *G06F 21/554* (2013.01)
USPC .................................... 726/23; 726/7; 726/25

(58) Field of Classification Search
CPC ......... G06F 21/32; G06F 21/42; G06F 21/56; G06F 21/562–21/566; H04L 63/1441; H04L 63/145; H04L 63/18; H04L 63/08
USPC ................................. 726/7, 22–25
See application file for complete search history.

(56) References Cited

U.S. PATENT DOCUMENTS

| 8,265,600 | B2 * | 9/2012 | Baysinger | 455/411 |
| 2009/0199272 | A1 * | 8/2009 | Gopalakrishna | 726/3 |
| 2010/0251391 | A1 * | 9/2010 | Adrangi | 726/34 |
| 2012/0210443 | A1 * | 8/2012 | Blaisdell et al. | 726/27 |
| 2013/0247187 | A1 * | 9/2013 | Hsiao et al. | 726/22 |
| 2013/0303154 | A1 * | 11/2013 | Gupta et al. | 455/423 |

OTHER PUBLICATIONS

Kindsight Security Labs, "Malware Analysis Report", Sep. 2011, http://www.kindsight.net/sites/default/files/android_trojan_zitmo_final_pdf_17585.pdf, pp. 1-13.*
Bose et al., "Behavioral Detection of Malware on Mobile Handsets", 2008, pp. 225-238, MobiSys '08, Proceedings of the 6t International Conference on Mobile Systems, Applications, and Services.*

* cited by examiner

*Primary Examiner* — Hadi Armouche
*Assistant Examiner* — Hee Song
(74) *Attorney, Agent, or Firm* — ALG Intellectual Property, LLC (57) ABSTRACT

A computer-implemented method for detecting illegitimate out-of-band authentication attempts may include 1) identifying a text message that includes a confirmation code for an out-of-band authentication procedure, 2) detecting an attempt to access the text message, 3) determining that the attempt to access the text message was configured to avoid user participation, and 4) performing, in response to determining that the attempt to access the text message was configured to avoid user participation, a remediation action that addresses an illegitimate out-of-band authentication attempt that includes the attempt to access the text message. Various other methods, systems, and computer-readable media are also disclosed.

20 Claims, 6 Drawing Sheets

SYSTEMS AND METHODS FOR DETECTING ILLEGITIMATE OUT-OF-BAND AUTHENTICATION ATTEMPTS

BACKGROUND

Although convenient, Internet transactions are often insecure and/or easily compromised. For example, malicious individuals may use stolen login information to access the online accounts of users via the Internet, potentially leading to the exposure of sensitive personal and/or financial information. In view of these and other security risks associated with Internet transactions, some institutions have begun using out-of-band authentication procedures in an attempt to verify the legitimacy of, and/or to authenticate the users involved in, such transactions. For example, an institution (such as a financial institution) may, upon receiving a request from a user to initiate a transaction via the Internet, send a confirmation code to the user via an alternative means of communication (e.g., by sending a text message to the user's mobile computing device). In this example, the user may then submit the confirmation code to the institution via the Internet in order to authenticate himself/herself and/or to verify the legitimacy of the transaction.

Unfortunately, malware authors may compromise such out-of-band authentication procedures by installing malware on an unsuspecting user's mobile computing device (by, e.g., tricking the user into downloading a malicious application and/or exploiting vulnerabilities in the device's web browser) that is designed to intercept the confirmation codes generated during such authentication procedures. Once this malware is installed, the malware author may successfully pose as the user during an illegitimate transaction with an institution that requires out-of-band authentication by 1) initiating the transaction with the institution, 2) using the malware installed on the user's mobile computing device to intercept out-of-band confirmation codes sent from the institution to the user's mobile computing device during an out-of-band authentication procedure associated with the transaction, and then 3) using the intercepted confirmation codes to complete the out-of-band authentication procedure and conduct the illegitimate transaction with the institution.

In view of the above, the instant disclosure identifies and addresses a need for systems and methods for detecting and remediating illegitimate out-of-band authentication attempts.

SUMMARY

As will be described in greater detail below, the instant disclosure generally relates to systems and methods for detecting and remediating illegitimate out-of-band authentication attempts by intercepting attempts to access text messages containing authentication information without the awareness and/or participation of a user. In one example, a computer-implemented method for performing such a task may include 1) identifying a text message that includes a confirmation code for an out-of-band authentication procedure, 2) detecting an attempt to access the text message, 3) determining that the attempt to access the text message was configured to avoid user participation, and 4) performing, in response to determining that the attempt to access the text message was configured to avoid user participation, a remediation action that addresses an illegitimate out-of-band authentication attempt that includes the attempt to access the text message.

In some examples, identifying the text message may include determining that the text message is associated with the out-of-band authentication procedure based on a format of the text message and/or a source of the text message. In addition, determining that the attempt to access the text message was configured to avoid user participation may include any of a variety of steps. For example, the attempt to access the text message may include an attempt to delete the text message. In this example, determining that the attempt to access the text message was configured to avoid user participation may include determining that the attempt to delete the text message happened within a suspiciously short amount of time according to a predetermined suspicion heuristic.

In another example, the attempt to access the text message may include an attempt to forward the text message. In this example, determining that the attempt to access the text message was configured to avoid user configuration may include determining that the attempt to forward the text message happened within a suspiciously short amount of time according to a predefined suspicion heuristic. Additionally or alternatively, determining that the attempt to access the text message was configured to avoid user participation may include determining that a target recipient of the attempt to forward the text message is a non-trusted recipient. In some examples, determining that the attempt to access the text message was configured to avoid user participation may include determining that information identifying a target recipient of the attempt to forward the text message was deleted.

In some embodiments, determining that the attempt to access the text message was configured to avoid user participation may include determining that the text message was marked as unread at a time of the attempt to access the text message. Additionally or alternatively, determining that the attempt to access the text message was configured to avoid user participation may include determining that the attempt was not performed via a text messaging application.

Performing the remediation action may include any of a variety of steps. For example, performing the remediation action may include blocking the attempt to access the text message. Additionally or alternatively, performing the remediation action may include 1) warning a user of the attempt, 2) warning a sender of the text message of the attempt, and/or 3) disabling an application with a permission to access text messages.

In one embodiment, a system for implementing the above-described method may include 1) an identification module programmed to identify a text message that includes a confirmation code for an out-of-band authentication procedure, 2) a detection module programmed to detect an attempt to access the text message, 3) a determination module programmed to determine that the attempt to access the text message was configured to avoid user participation, and 4) a remediation module programmed to perform, in response to determining that the attempt to access the text message was configured to avoid user participation, a remediation action that addresses an illegitimate out-of-band authentication attempt that includes the attempt to access the text message. The system may also include at least one processor configured to execute the identification module, the detection module, the determination module, and the remediation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a text message that includes a confirmation code for an out-of-band authentication procedure, 2) detect an attempt to access the text message, 3) determine that the attempt to access the text message was configured to avoid user participation, and 4) perform, in response to determining that the attempt to access the text message was configured to avoid user participation, a remediation action that addresses an illegitimate out-of-band authentication attempt that includes the attempt to access the text message.

As will be explained in greater detail below, by intercepting attempts to access text messages containing authentication information that are designed to avoid the awareness and/or participation of a user, the systems and methods described herein may potentially detect and/or prevent fraudulent transactions involving compromised out-of-band authentications. Additionally or alternatively, these systems and methods may identify and/or disrupt applications responsible for illegitimately intercepting authentication information used in out-of-band authentication procedures.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
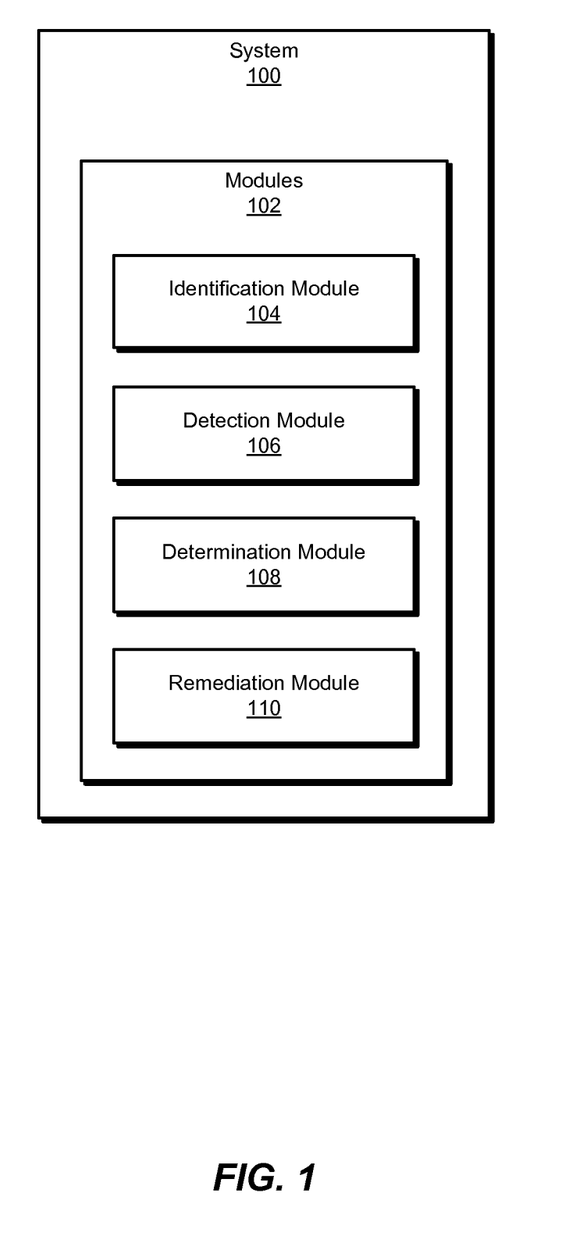
FIG. 1 is a block diagram of an exemplary system for detecting illegitimate out-of-band authentication attempts.
Figure 2:
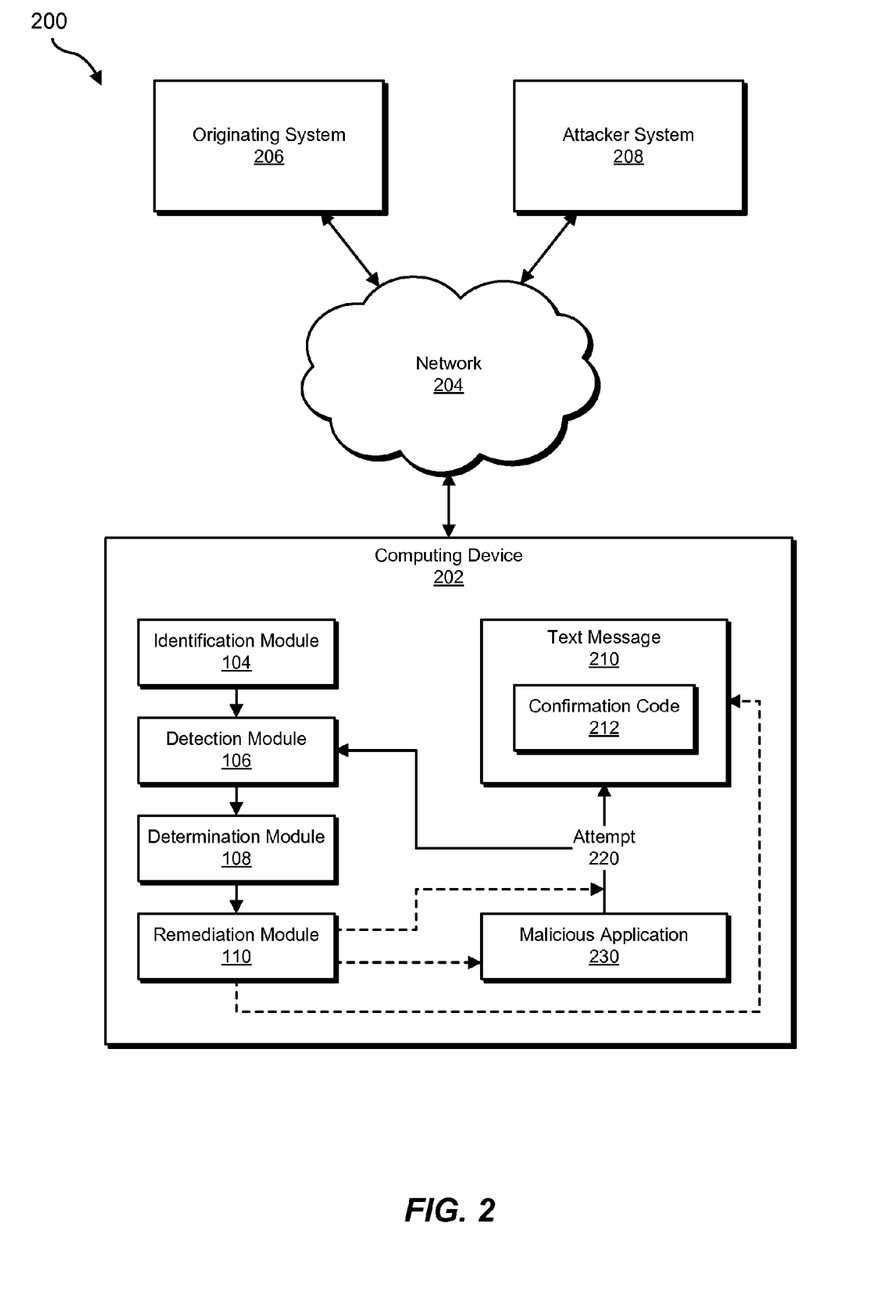
FIG. 2 is a block diagram of an exemplary system for detecting illegitimate out-of-band authentication attempts.

The following will provide, with reference to FIGS. 1-2, detailed descriptions of exemplary systems for detecting illegitimate out-of-band authentication attempts. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting illegitimate out-of-band authentication attempts. As illustrated in this figure, exemplary system 100 may include one or more modules 102 for performing one or more tasks. For example, and as will be explained in greater detail below, exemplary system 100 may include an identification module 104 programmed to identify a text message that includes a confirmation code for an out-of-band authentication procedure. Exemplary system 100 may also include a detection module 106 programmed to detect an attempt to access the text message.

In addition, and as will be described in greater detail below, exemplary system 100 may include a determination module 108 programmed to determine that the attempt to access the text message was configured to avoid user participation. Exemplary system 100 may also include a remediation module 110 programmed to perform a remediation action that addresses an illegitimate out-of-band authentication attempt that includes the attempt to access the text message. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or originating system 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with an originating system 206 and an attacker system 208 via a network 204. For example, computing device 202 may receive a text message 210 from an originating system 206 that includes authentication information for an illegitimate transaction initiated by attacker system 208 posing as the owner of computing device 202.

In one embodiment, one or more of modules 102 from FIG. 1 may, when executed by at least one processor of computing device 202, facilitate computing device 202 in detecting illegitimate out-of-band authentication attempts. For example, and as will be described in greater detail below, one or more of modules 102 may cause computing device 202 to 1) identify a text message 210 that includes a confirmation code 212 for an out-of-band authentication procedure, 2) detect an attempt 220 to access text message 210, 3) determine that attempt 220 to access text message 210 was configured to avoid user participation, and 4) perform, in response to determining that the attempt 220 to access text message 210 was configured to avoid user participation, a remediation action that addresses an illegitimate out-of-band authentication attempt that includes attempt 220 to access text message 210.

Computing device 202 generally represents any type or form of computing device capable of reading computer-executable instructions. Examples of computing device 202 include, without limitation, tablets, cellular phones, personal digital assistants (PDAs), laptops, desktops, servers, multimedia players, embedded systems, combinations of one or more of the same, exemplary computing system 510 in FIG. 5, or any other suitable computing device.

Originating system 206 generally represents any type or form of computing device that is capable of sending a text message and/or participating in an authentication process. Examples of originating system 206 include, without limitation, application servers and database servers configured to provide various database services and/or run certain software applications.

Attacker system 208 generally represents any type or form of computing device that is capable of receiving authentication information, communicating with malware installed on a computing device, and/or performing transactions requiring authentication with computing devices. Examples of attacker system 208 include, without limitation, application servers and database servers configured to provide various database services and/or run certain software applications.

Network 204 generally represents any medium or architecture capable of facilitating communication or data transfer. Examples of network 204 include, without limitation, a wide area network (WAN), the Internet, a cellular network (e.g., a GSM Network), power line communications (PLC), a local area network (LAN), an intranet, a personal area network (PAN), exemplary network architecture 600 in FIG. 6, or the like. Network 204 may facilitate communication or data transfer using wireless or wired connections. In one embodiment, network 204 may facilitate communication between computing device 202, originating system 206, and/or attacker system 208.

Figure 3:
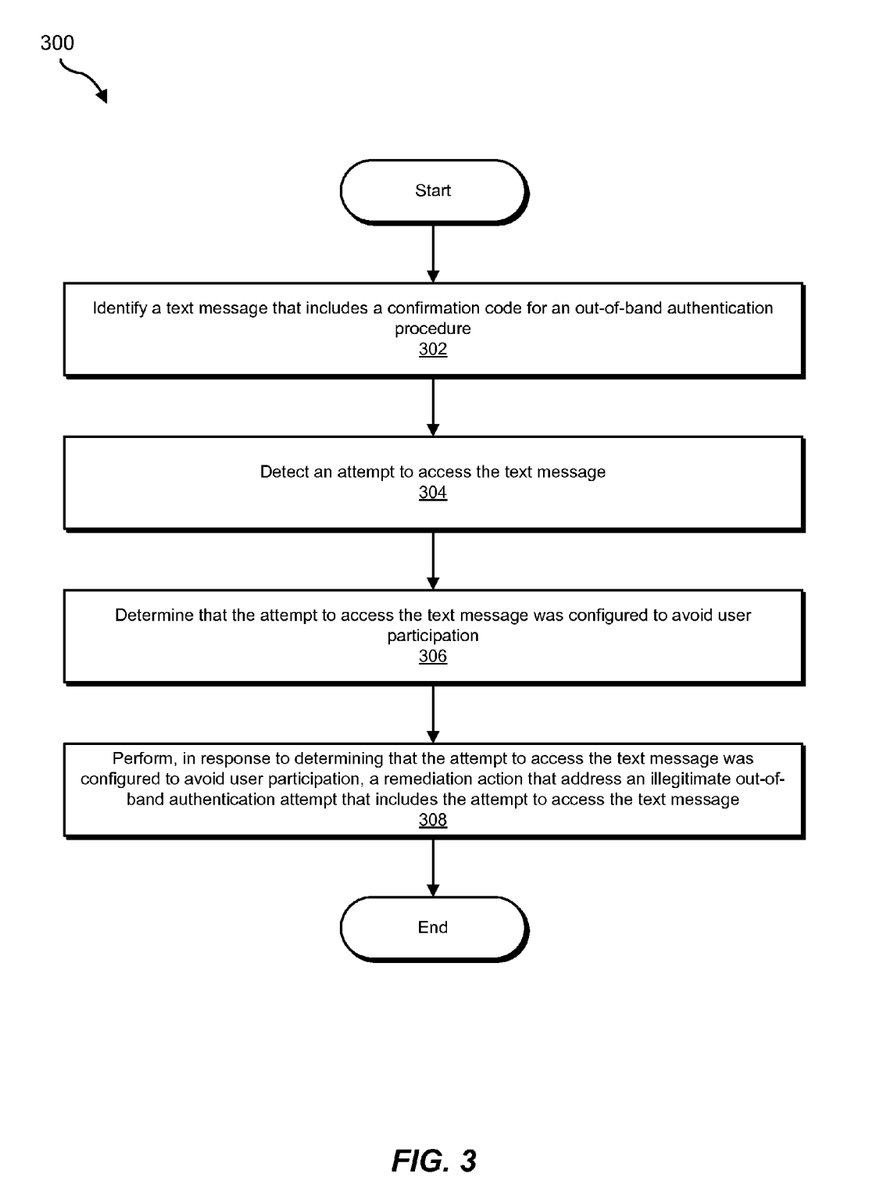
FIG. 3 is a flow diagram of an exemplary method for detecting illegitimate out-of-band authentication attempts.

FIG. 3 is a flow diagram of an exemplary computer-implemented method 300 for detecting illegitimate out-of-band authentication attempts. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a text message that includes a confirmation code for an out-of-band authentication procedure. For example, identification module 104 may, as part of computing device 202 in FIG. 2, identify a text message 210 that includes a confirmation code 212 for an out-of-band authentication procedure.

As used herein, the phrase "text message" may refer to any communication capable of relaying a confirmation code. For example, the text message may include a Short Message Service (SMS) message. Additionally or alternatively, the text message may include an instant message, a push notification, an email, and/or a message specific to messaging implementation of an application (e.g., a mobile application created by a financial institution).

As used herein, the phrase "confirmation code" may refer to any code, password, and/or other form authentication information. For example, the confirmation code may be designed to allow a user to provide the confirmation code (and/or a passcode derived from the confirmation code) to an institution to confirm a transaction as valid.

As used herein, the phrase "out-of-band authentication procedure" (or simply "out-of-band authentication") may refer to any authentication technique that employs a communication channel that is different or separate from the communication channel used for conducting a transaction for which authentication is required. In some examples, an out-of-band authentication procedure may play a part in a multifactor authentication process.

In some examples, identification module 104 may, as a part of identifying the text message, determine that the text message is associated with the out-of-band authentication procedure based on one or more characteristics of the text message. For example, identification module 104 may determine that the text message is associated with the out-of-band authentication procedure based on a format of the text message. For example, identification module 104 may compare the text message to one or more templates of known out-of-band authentication messages to determine that the text message is associated with the out-of-band authentication procedure. Additionally or alternatively, identification module 104 may parse the text message for one or more words, phrases, and/or patterns indicative of an out-of-band authentication message. In some examples, identification module 104 may determine that the text message is associated with the out-of-band authentication procedure based on a source of the text message. For example, identification module 104 may identify a phone number, email address, and/or account handle as the source of the text message and compare the source of the text message to a list of known authenticators (e.g., a list of phone numbers used by financial institutions for out-of-band authentication systems). Additionally or alternatively, identification module 104 may identify a special phone code used for privileged communications.

In some examples, identification module 104 may contribute to future determinations by collecting information about the format and/or source of the text message. For example, identification module 104 may determine that the source of the text message indicates that the text message is from a bank. Identification module 104 may then submit the text message (and/or one or more formatting features of the text message) to a database used for identifying text message formats that indicate out-of-band authentication. Likewise, identification module 104 may determine that the format of the text message indicates that the text message is from a bank. Identification module 104 may then submit the source of the text message to a database of likely financial institutions.

Identification module 104 may identify the text message in any of a variety of ways. For example, identification module 104 may receive a message from an event handler that a new text message has arrived. Additionally or alternatively, identification module 104 may monitor a folder for received text messages for new text messages. In another example, identification module 104 may monitor a notification list for a notification of a new text message. In some examples, identification module 104 may also identify and/or record a time that the text message was received.

Identification module 104 may identify the text message in any suitable context. For example, identification module 104 may identify the text message before the attempt to access the text message (e.g., by malware on the computing device). Additionally or alternatively, identification module 104 may identify the text message by identifying the attempt to access the text message (e.g., by intercepting the attempt, blocking the attempt, and/or observing the attempt). In some examples, identification module 104 may identify the text message after the attempt to access the text message (e.g., after the text message has been forwarded and/or deleted). Accordingly, in some examples identification module 104 may identify the text message by identifying indicia of the text message even after the text message has been removed from the computing device.

Figure 4:
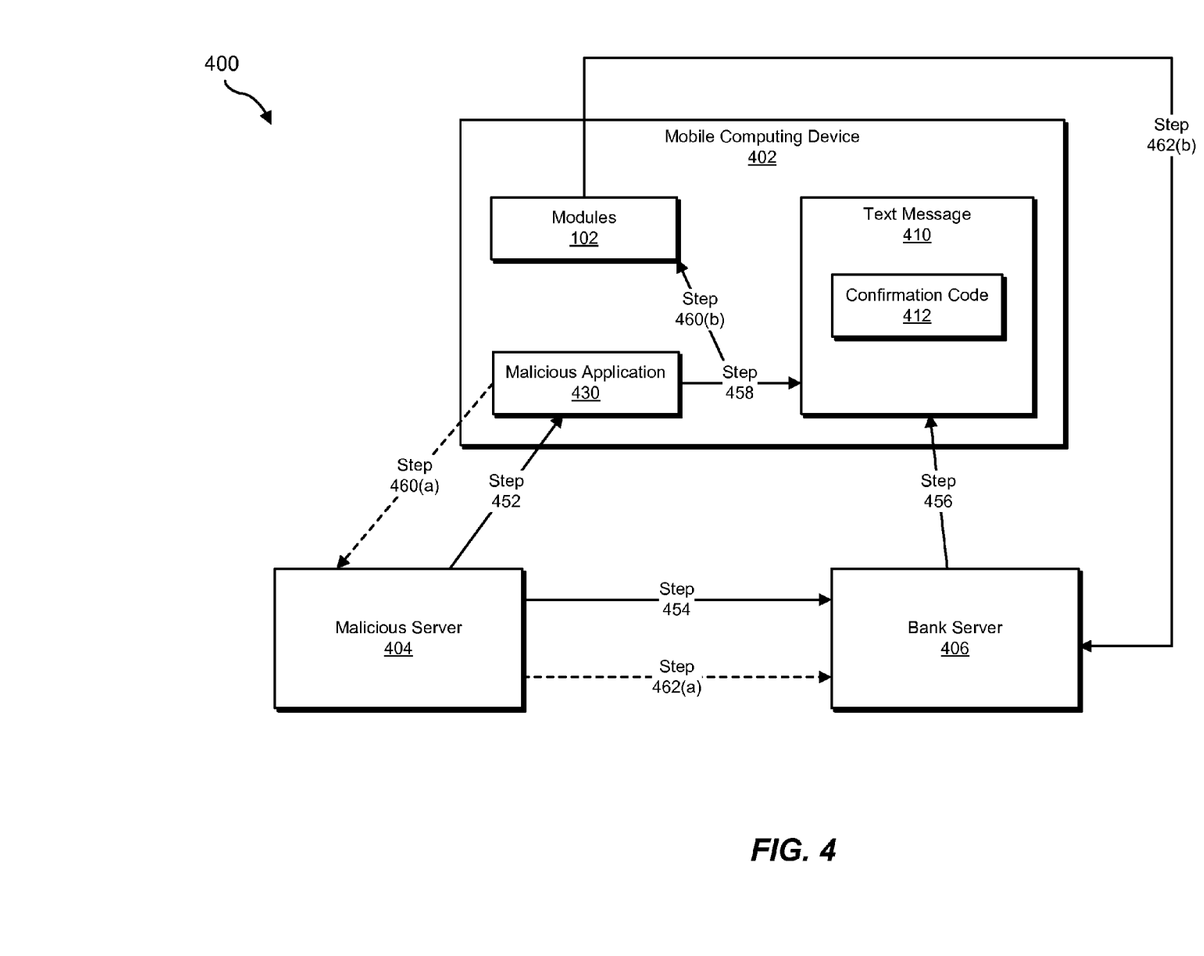
FIG. 4 is a block diagram of an exemplary system for detecting illegitimate out-of-band authentication attempts.

FIG. 4 illustrates an exemplary system 400 for detecting illegitimate out-of-band authentication attempts. As shown in FIG. 4, exemplary system 400 may include a mobile computing device 402, a malicious server 404, and a bank server 406. Using FIG. 4 as an example, at step 452 a malicious server 404 may provide a malicious application 430 to mobile computing device 402. For example, malicious server 404 may exploit a vulnerability in mobile computing device 402 to install malicious application 430. Additionally or alternatively, malicious server 404 may present malicious application 430 as a legitimate application, and a user of mobile computing device 402 may intentionally install malicious application 430. In some examples, mobile computing device 402 may download malicious application 430 from a legitimate source (e.g., a legitimate application store) that failed to screen malicious application 430 from its listings. In some examples, malicious application 430 may harvest personal information from mobile computing device 402 (e.g., via a phishing attack, by monitoring and/or intercepting communications, and/or by reading stored data on mobile computing device 402) and send the data (e.g., bank account information) to malicious server 404. At step 454, malicious server 404 may attempt to initiate a transaction with bank server 406 (e.g., to transfer money from the account of a user of mobile computing device 402 to an account of an attacker that controls malicious server 404). At step 456, bank server 406 may transmit a text message 410 with a confirmation code 412 to mobile computing device 402 so that the user of mobile computing device 402 can verify that the attempted transaction is valid. Accordingly, at step 302 of FIG. 3, identification module 104 may, as a part of modules 102 on mobile computing device 402, identify text message 410 on mobile computing device 410.

Returning to FIG. 3, at step 304 one or more of the systems described herein may detect an attempt to access the text message identified in step 302. For example, detection module 106 may, as part of computing device 202 in FIG. 2, detect an attempt 220 to access text message 210.

Detection module 106 may detect the attempt to access the text message in any of a variety of ways. In some examples, the attempt to access the text message may include an attempt to delete the text message. Accordingly, detection module 106 may intercept an attempt to delete the text message and/or identify a deletion of the text message. For example, detection module 106 may periodically poll a text message folder for a short time after receiving the text message to determine if the text message has been deleted. Additionally or alternatively, the attempt to access the text message may include an attempt to forward the text message. Accordingly, detection module 106 may intercept an attempt to forward the text message and/or identify a forwarding of the text message. The attempt to forward the text message may include any of a variety of forwarding methods. For example, the attempt to forward the text message may include an attempt to relay the text message to another recipient using the same protocol with which the text message was received (e.g., using an SMS message). Additionally or alternatively, the attempt to forward the text message may include an attempt to transmit the contents of the text message (e.g., the confirmation code) to another computing device via an alternative means of communication (e.g., an instant message, an email, an HTML POST request to a server, a file upload to a server, etc.). In some examples, detection module 106 may detect an attempt to read from the text message.

In some examples, detection module 106 may detect an application that attempted to access the text message. In these examples, detection module 106 may also record information about the application (e.g., to be submitted to a security server if determination module 108 determines that the application is suspicious). The information may include fingerprints of one or more components of the application, a publisher of the application, an origin of the application, and/or the entirety of the application.

Using FIG. 4 as an example, at step 458 malicious application 430 may attempt to access text message 410 (e.g., to read text message 410, delete text message 410, and/or forward text message 410). At step 460(b), detection module 106 may, as a part of modules 102 on mobile computing device 402, detect the attempt by malicious application 430 to access text message 410.

Returning to FIG. 3, at step 306 one or more of the systems described herein may determine that the attempt to access the text message was configured to avoid user participation. For example, determination module 108 may, as part of computing device 202 in FIG. 2, determine that attempt 220 to access text message 210 was configured to avoid user participation.

Determination module 108 may determine that the attempt to access the text message was configured to avoid user participation in any of a variety of ways. For example, as mentioned earlier, the attempt to access the text message may include an attempt to delete the text message. In this example, determination module 108 may determine that the attempt to access the text message was configured to avoid user participation by determining that the attempt to delete the text message happened within a suspiciously short amount of time according to a predetermined suspicion heuristic. The suspicion heuristic may use any suitable approach. For example, the suspicion heuristic may determine that the time elapsed between the text message being received and being deleted is suspicious (e.g., indicative of malware) by determining that the time elapsed falls below a predetermined threshold (e.g., two seconds). Additionally or alternatively, the suspicion heuristic may determine that the time elapsed is suspicious based on the time elapsed falling below an observed threshold (e.g., less time than a user has ever before taken to delete a text message). In some examples, determination module 108 may weight the time elapsed as one of multiple factors (e.g., including one or more of the factors described below) in determining whether the attempt to delete the text message was malicious.

As mentioned earlier, in some examples the attempt to access the text message may include an attempt to forward the text message. In this example, determination module 108 may determine that the attempt to access the text message was configured to avoid user participation by determining that the attempt to forward the text message happened within a suspiciously short amount of time according to a predetermined suspicion heuristic. The suspicion heuristic may use any suitable approach. For example, the suspicion heuristic may determine that the time elapsed between the text message being received and being deleted is suspicious (e.g., indicative of malware) by determining that the time elapsed falls below a predetermined threshold (e.g., two seconds). Additionally or alternatively, the suspicion heuristic may determine that the time elapsed is suspicious based on the time elapsed falling below an observed threshold (e.g., less time than a user has ever before taken to forward a text message). In some examples, determination module 108 may weight the time elapsed as one of multiple factors in determining whether the attempt to forward the text message was malicious.

In some examples, determination module 108 may determine that the attempt to access the text message was configured to avoid user participation by determining that a target recipient of the attempt to forward the text message is a non-trusted recipient. For example, determination module 108 may check a phone number, email address, and/or messaging account handle to which the forwarding attempt was directed against a list of trusted contacts (e.g., contacts saved for use by one or more applications on the computing device). Additionally or alternatively, determination module 108 may check the target of the forwarding attempt against a blacklist retrieved from a security server.

In some examples, determination module 108 may determine that the attempt to access the text message was configured to avoid user participation by determining that information identifying a target recipient of the attempt to forward the text message was deleted. For example, determination module 108 may identify that the forwarded message was deleted from a sent folder of a messaging application.

In some examples, determination module 108 may determine that the attempt to access the text message was configured to avoid user participation by determining that the text message was marked as unread at a time of the attempt to access the text message. For example, determination module 108 may determine that an attempt to delete the text message was performed when the text message was unread. Additionally or alternatively, determination module 108 may determine that an attempt to forward the text message was performed when the text message was unread.

Additionally or alternatively, determination module 108 may determine that the attempt to access the text message was configured to avoid user participation by determining that the attempt was not performed via a text messaging application. For example, determination module 108 may determine that the text messaging application was not in the foreground at the time of the attempt. Additionally or alternatively, determination module 108 may identify user interface navigation data to determine that the user did not navigate to the text messaging application to perform the attempt. In some examples, determination module 108 may identify a process and/or application that performed a system call behind the attempt.

Determination module 108 may also use any of a variety of additional factors in determining whether the attempt to access the text message was configured to avoid user participation. For example, determination module 108 may determine that a notice of the text message was removed from a notification area within a short period of time. Generally, determination module 108 may use any suitable factors, indicia, and/or evidences of malicious behavior and/or circumvention of the user in any combination in making the determination.

Returning to FIG. 3, at step 308 one or more of the systems described herein may perform, in response to determining that the attempt to access the text message was configured to avoid user participation, a remediation action that addresses an illegitimate out-of-band authentication attempt that includes the attempt to access the text message. For example, remediation module 110 may, as part of computing device 202 in FIG. 2, perform a remediation action that addresses an illegitimate out-of-band authentication attempt that includes attempt 220 to access text message 210 in response to determining that attempt 220 to access text message 210 was configured to avoid user participation.

The remediation action may include any of a variety of actions. For example, the remediation action may include blocking the attempt to access the text message. For example, remediation module 110 may block an attempt to read the text message, to delete the text message, and/or to forward the text message. In some examples, remediation module 110 may warn a user of the attempt to access the text message. For example, remediation module 110 may warn the user of a potential illegitimate transaction, show the text message to the user, show the attempted forwarded text message to the user, identify a potentially responsible application to the user, and/or identify an implicated authenticator (e.g., a financial institution) to the user. In another example, remediation module 110 may warn a sender of the text message of the attempt. For example, remediation module 110 may send a communication that the confirmation code has been compromised to the sender of the text message. Additionally or alternatively, remediation module 110 may transmit information identifying a user of the computing device (e.g., a phone number of the computing device) to the sender of the text message. In some examples, remediation module 110 may also transmit information relating to the attempt to a security vendor.

In some examples, the remediation action may include an action performed on an application. For example, remediation module 110 may disable an application with a permission to access text messages on the computing device. In some examples, remediation module 110 may identify one or more non-trusted applications (e.g., applications from non-trusted publishers, applications with low community reputation scores). Remediation module 110 may then report the non-trusted application (e.g., to an application store, to a security vendor, etc.), disable the non-trusted application on the computing device, and/or uninstall the application from the computing device.

Using FIG. 4 as an example, at step 462(b) remediation module 110 may, as a part of modules 102 on mobile computing device 402, warn bank server 406 that confirmation code 412 may have been compromised. In some examples, bank server 406 may then reject an attempt to use confirmation code 412. For example, malicious application 430 may, at step 460(a), forward confirmation code 412 to malicious server 404. Malicious server 404 may then, at step 462(a), submit confirmation code 412 to bank server 406. However, bank server 406 may deny and/or cancel a transaction after receiving the warning from remediation module 110. Alternatively, in some examples, malicious application 430 may be unable to forward confirmation code 412 in step 460(a) (and, so, malicious server 404 may be unable to submit confirmation code 412 in step 462(a)) because remediation module 110 may have blocked the attempt to forward confirmation code 412.

As explained above, by intercepting attempts to access text messages containing authentication information that are designed to avoid the awareness and/or participation of a user, the systems and methods described herein may potentially detect and/or prevent fraudulent transactions involving compromised out-of-band authentications. Additionally or alternatively, these systems and methods may identify and/or disrupt applications responsible for illegitimately intercepting authentication information used in out-of-band authentication procedures.

Figure 5:
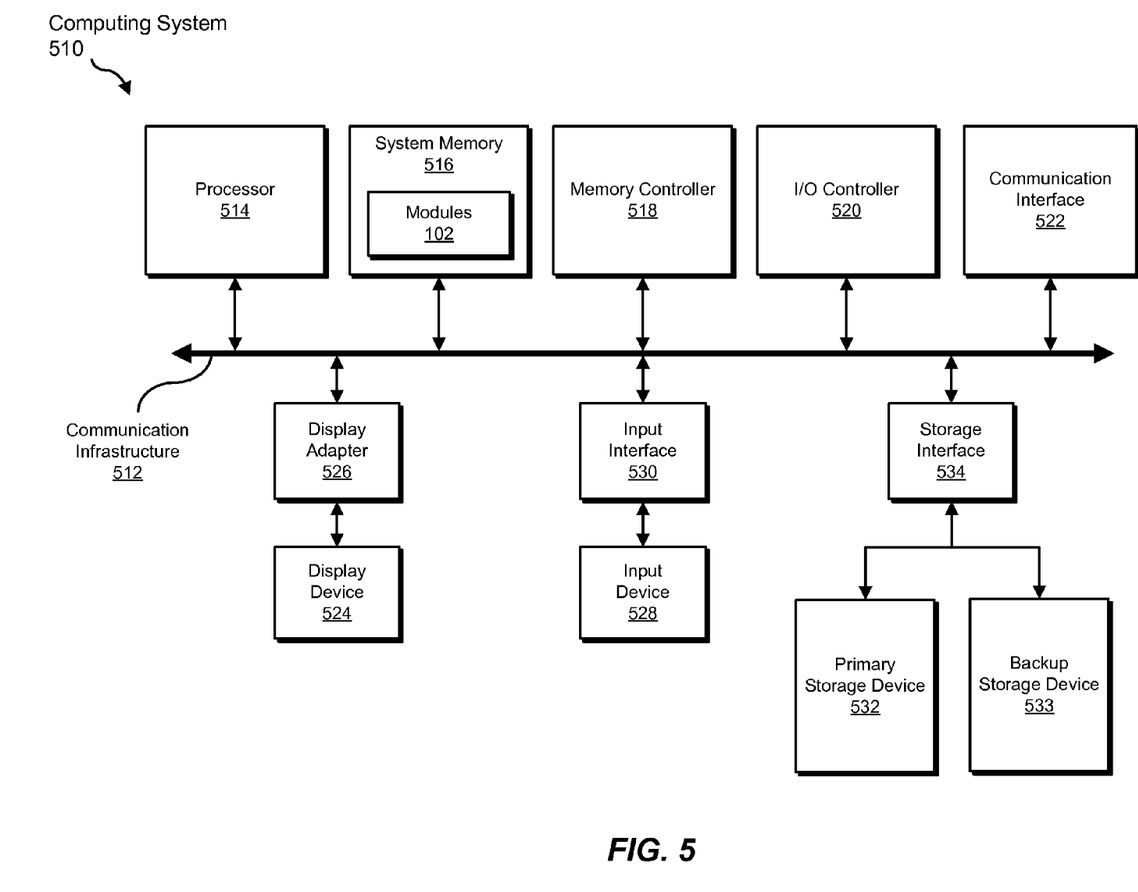
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, determining, detecting, performing, blocking, warning, and disabling steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
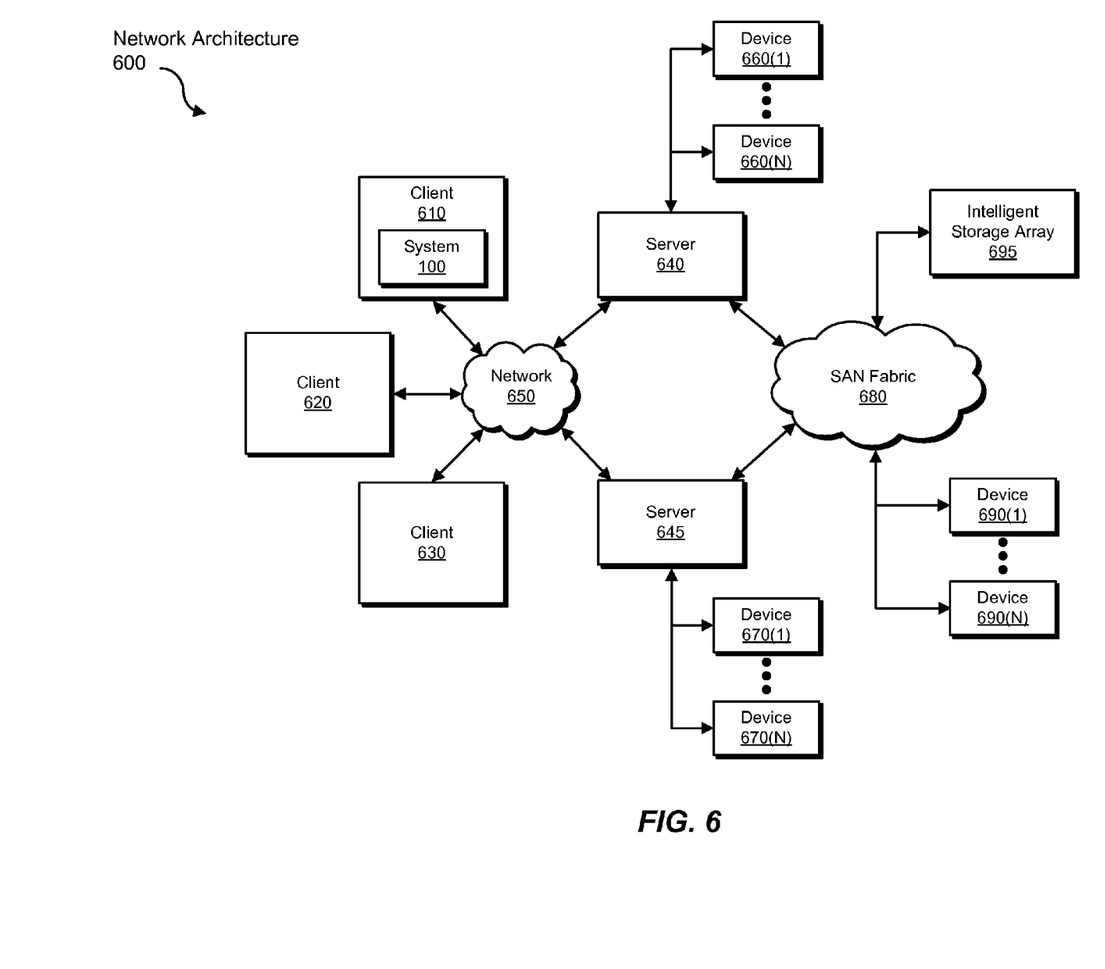
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, detecting, performing, blocking, warning, and disabling steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting illegitimate out-of-band authentication attempts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for detecting and/or preventing illegitimate out-of-band authentications.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting illegitimate out-of-band authentication attempts, at least a portion of the method being performed by a computing device comprising at least one processor, the method comprising:

determining that a text message comprises a confirmation code for an out-of-band authentication procedure based on at least one of:
a format of the text message;
a source of text message;
detecting an attempt to access the text message;
determining that the attempt to access the text message was configured to avoid participation by a user of a device on which the attempt to access the text message occurred;
performing, in response to determining both that the attempt to access the text message was configured to avoid participation by the user and that the text message comprises the confirmation code for the out-of-band authentication procedure, a remediation action that addresses an illegitimate out-of-band authentication attempt, the illegitimate out-of-band authentication attempt comprising the attempt to access the text message, wherein performing the remediation action comprises at least one of:
blocking the attempt to access the text message;
warning a user of the attempt;
warning a sender of the text message of the attempt;
disabling an application with a permission to access text messages.

2. The computer-implemented method of claim 1, wherein:
the attempt to access the text message comprises an attempt to delete the text message;
determining that the attempt to access the text message was configured to avoid participation by the user comprises determining that the attempt to delete the text message happened within a suspiciously short amount of time according to a predefined suspicion heuristic.

3. The computer-implemented method of claim 1, wherein:
the attempt to access the text message comprises an attempt to forward the text message;
determining that the attempt to access the text message was configured to avoid participation by the user comprises determining that the attempt to forward the text message happened within a suspiciously short amount of time according to a predefined suspicion heuristic.

4. The computer-implemented method of claim 1, wherein determining that the attempt to access the text message was configured to avoid participation by the user comprises determining that the text message was marked as unread at a time of the attempt to access the text message.

5. The computer-implemented method of claim 1, wherein determining that the attempt to access the text message was configured to avoid participation by the user comprises determining that the attempt was not performed via a text messaging application.

6. The computer-implemented method of claim 1, wherein:
the attempt to access the text message comprises an attempt to forward the text message;
determining that the attempt to access the text message was configured to avoid participation by the user comprises determining that a target recipient of the attempt to forward the text message is a non-trusted recipient.

7. The computer-implemented method of claim 1, wherein:
the attempt to access the text message comprises an attempt to forward the text message;
determining that the attempt to access the text message was configured to avoid participation by the user comprises determining that information identifying a target recipient of the attempt to forward the text message was deleted.

8. A system for detecting illegitimate out-of-band authentication attempts, the system comprising:

a memory;
an identification module, stored in the memory, that determines that a text message comprises a confirmation code for an out-of-band authentication procedure based on at least one of:
a format of the text message;
a source of text message;
a detection module, stored in the memory, that detects an attempt to access the text message;
a determination module, stored in the memory, that determines that the attempt to access the text message was configured to avoid participation by a user of a device on which the attempt to access the text message occurred;
a remediation module, stored in the memory, that performs, in response to determining both that the attempt to access the text message was configured to avoid participation by the user and that the text message comprises the confirmation code for the out-of-band authentication procedure, a remediation action that addresses an illegitimate out-of-band authentication attempt, the illegitimate out-of-band authentication attempt comprising the attempt to access the text message, wherein the remediation action comprises at least one of:
blocking the attempt to access the text message;
warning a user of the attempt;
warning a sender of the text message of the attempt;
disabling an application with a permission to access text messages;
at least one physical processor that executes the identification module, the detection module, the determination module, and the remediation module.

9. The system of claim 8, wherein:
the attempt to access the text message comprises an attempt to delete the text message;
the determination module is programmed to determine that the attempt to access the text message was configured to avoid participation by the user by determining that the attempt to delete the text message happened within a suspiciously short amount of time according to a predefined suspicion heuristic.

10. The system of claim 8, wherein:
the attempt to access the text message comprises an attempt to forward the text message;
the determination module is programmed to determine that the attempt to access the text message was configured to avoid participation by the user by determining that the attempt to forward the text message happened within a suspiciously short amount of time according to a predefined suspicion heuristic.

11. The system of claim 8, wherein the determination module is programmed to determine that the attempt to access the text message was configured to avoid participation by the user by determining that the text message was marked as unread at a time of the attempt to access the text message.

12. The system of claim 8, wherein the determination module is programmed to determine that the attempt to access the text message was configured to avoid participation by the user by determining that the attempt was not performed via a text messaging application.

13. The system of claim 8, wherein:
the attempt to access the text message comprises an attempt to forward the text message;
the determination module is programmed to determine that the attempt to access the text message was configured to avoid participation by the user by determining that a target recipient of the attempt to forward the text message is a non-trusted recipient.

14. The system of claim 8, wherein:
the attempt to access the text message comprises an attempt to forward the text message;
the determination module is programmed to determine that the attempt to access the text message was configured to avoid participation by the user by determining that information identifying a target recipient of the attempt to forward the text message was deleted.

15. A non-transitory computer-readable-storage medium comprising one or more computer-executable instructions that, when executed by at least one processor of a computing device, cause the computing device to:
determine that a text message comprises a confirmation code for an out-of-band authentication procedure based on at least one of:
a format of the text message;
a source of text message;
detect an attempt to access the text message;
determine that the attempt to access the text message was configured to avoid participation by a user of a device on which the attempt to access the text message occurred;
perform, in response to determining both that the attempt to access the text message was configured to avoid participation by the user and that the text message comprises the confirmation code for the out-of-band authentication procedure, a remediation action that addresses an illegitimate out-of-band authentication attempt, the illegitimate out-of-band authentication attempt comprising the attempt to access the text message, wherein the remediation action comprises at least one of:
blocking the attempt to access the text message;
warning a user of the attempt;
warning a sender of the text message of the attempt;
disabling an application with a permission to access text messages.

16. The computer-readable-storage medium of claim 15, wherein: the attempt to access the text message comprises an attempt to delete the text message;
determining that the attempt to access the text message was configured to avoid participation by the user comprises determining that the attempt to delete the text message happened within a suspiciously short amount of time according to a predefined suspicion heuristic.

17. The computer-readable-storage medium of claim 15, wherein: the attempt to access the text message comprises an attempt to forward the text message;
determining that the attempt to access the text message was configured to avoid participation by the user comprises determining that the attempt to forward the text message happened within a suspiciously short amount of time according to a predefined suspicion heuristic.

18. The computer-readable-storage medium of claim 15, wherein determining that the attempt to access the text message was configured to avoid participation by the user comprises determining that the text message was marked as unread at a time of the attempt to access the text message.

19. The computer-readable-storage medium of claim 15, wherein determining that the attempt to access the text message was configured to avoid participation by the user comprises determining that the attempt was not performed via a text messaging application.

20. The computer-readable-storage medium of claim 15, wherein: the attempt to access the text message comprises an attempt to forward the text message;
determining that the attempt to access the text message was configured to avoid participation by the user comprises determining that a target recipient of the attempt to forward the text message is a non-trusted recipient.

* * * * *

UNITED STATES PATENT AND TRADEMARK OFFICE
CERTIFICATE OF CORRECTION

| | | |
|---|---|---|
| PATENT NO. | : 8,973,137 B1 | Page 1 of 1 |
| APPLICATION NO. | : 13/408532 | |
| DATED | : March 3, 2015 | |
| INVENTOR(S) | : Ian Oliver | |

It is certified that error appears in the above-identified patent and that said Letters Patent is hereby corrected as shown below:

IN THE CLAIMS

Claim 1, at column 16, line 5, should read:
a source of the text message;

Claim 8, at column 17, line 7, should read:
a source of the text message;

Claim 15, at column 18, line 17, should read:
a source of the text message;

Claim 16, at column 18, lines 36 to 38, should read:
The computer-readable-storage medium of claim 15, wherein:
the attempt to access the text message comprises an attempt to delete the text message;

Claim 17, at column 18, lines 44 to 45, should read:
The computer-readable-storage medium of claim 15, wherein:
the attempt to access the text message comprises an attempt to forward the text message;

Claim 20, at column 18, lines 62 to 64, should read:
The computer-readable-storage medium of claim 15, wherein:
the attempt to access the text message comprises an attempt to forward the text message;

Signed and Sealed this
Sixth Day of October, 2015

Michelle K. Lee
*Director of the United States Patent and Trademark Office*